United States Patent [19]
Tsumori

[11] 3,973,105
[45] Aug. 3, 1976

[54] PROTECTIVE DEVICE FOR INDUCTION HEATING APPARATUS

[75] Inventor: Akihiro Tsumori, Shizuoka, Japan

[73] Assignee: Mitsubishi Denki Kabushiki Kaisha, Tokyo, Japan

[22] Filed: Oct. 15, 1974

[21] Appl. No.: 514,782

[30] Foreign Application Priority Data
Oct. 24, 1973  Japan.................................. 48-119653
Feb. 21, 1974  Japan.................................. 49-21094
Feb. 21, 1974  Japan.................................. 49-21095

[52] U.S. Cl. .......................... 219/10.49; 219/10.77; 317/137; 340/248 C
[51] Int. Cl.² ........................................ H05B 5/04
[58] Field of Search .................. 219/10.77, 10.49; 317/12, 53, 137; 340/253 Y, 248 C

[56] References Cited
UNITED STATES PATENTS

| | | | |
|---|---|---|---|
| 2,001,219 | 5/1935 | Shaw................................ | 219/10.49 |
| 3,441,876 | 4/1969 | Zwaueuburg...................... | 219/10.77 |
| 3,530,499 | 9/1970 | Schroeder......................... | 219/10.49 |
| 3,775,577 | 11/1973 | Peters.............................. | 219/10.49 |
| 3,781,506 | 12/1973 | Ketchum et al. ................ | 219/10.49 |
| 3,814,888 | 6/1974 | Bowers et al. ................... | 219/10.77 |
| 3,821,509 | 6/1974 | Amagami et al................. | 219/10.49 |
| 3,823,297 | 7/1974 | Cunninghan..................... | 219/10.77 |
| 3,889,090 | 6/1975 | MacKenzie....................... | 219/10.49 |

Primary Examiner—Bruce A. Reynolds
Attorney, Agent, or Firm—Oblon, Fisher, Spivak, McClelland & Maier

[57] ABSTRACT

A protective device for an induction heating apparatus comprising: means for detecting a change of value and phase of a current passed to an excitor for induction-heating a heating element by generating an alternating magnetic field; and means for breaking the current passed to the excitor when the change is higher than a predetermined value.

2 Claims, 10 Drawing Figures

PROTECTIVE DEVICE FOR INDUCTION HEATING APPARATUS

BACKGROUND OF THE INVENTION

The present invention relates to a protective device for an induction heating apparatus used for cooking by utilizing heat from electromagnetic induction. The induction heating apparatus heats by electromagnetic induction with high efficiency without noise even though the exciting current is of low frequency such as commercial frequency.

The induction heating apparatus comprises an excitor forming at least two groups of magnetic circuits which include excitation cores wound by excitation windings. A capacitor having a specifc value is connected in series to at least one of the excitation windings so as to pass a current having a 45° phase gain from the power voltage to the excitation winding and so as to pass a current having a 45° phase delay from the power voltage to the other excitation winding. A heating element comprises a specific cooking apparatus e.g. a specific pot which has a bottom of superposed plates (or alloy) made of non-magnetic metal e.g. copper and ferromagnetic metal. The water or food in the specific cooking pot is heated by the eddy current loss generated by the alternating magnetic flux which is passed from the excitation core through the non-magnetic metal to the magnet metal and is returned to the excitation core through the non-magnetic metal.

In the induction heating apparatus utilizing low frequency, the current passing through the circuit which connects the excitation winding and the capacitor in series is increased and the phase is shifted when the apparatus is used in an abnormal state such as where the cooking pot is heated while empty or such as where the pot is different from the specific pot required or such as where no pot is put on the excitor. Therefore, a current or voltage higher than the rated current or voltage is applied to the excitor. This can cause burning or insulation damage. If the pot is heated while empty, a fire may result. If a pot other than the required pot is used, abnormal vibration will be caused.

SUMMARY OF THE INVENTION

It is an object of the invention to provide a protective device for overcoming these difficulties and for preventing an accident in the abnormal states in the induction heating apparatus.

It is another object of the invention to provide a protective device which is actuated at a substantially constant temperature of the specific cooking pot in order to prevent changing of the temperature of the specific cooking pot at the time of actuation of the protective device which is actuated depending upon the current passing to the excitation windings and the deviation of the phase of the current.

It is another object of the invention to provide a protective device wherein a semiconductor switching element is connected in series to a relay so as to pass current to the relay only when the current passing to the excitation windings and the deviation of the phase of the current are higher than predetermined values in order to prevent a chattering phenomenon.

The foregoing and other objects are attained in accordance with one aspect of the present invention through the provision of a protective device for an induction heating apparatus which comprises means for detecting a current passing through an excitor for forming an alternating magnetic field to heat a heating element and means for breaking the current passing to the excitor when the deviation exceeds a predetermined value.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

Figure 1:
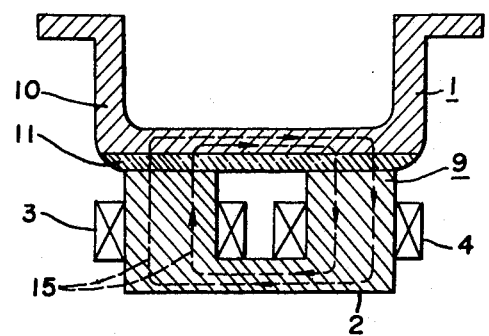
FIG. 1 is a sectional view showing the principle of operation of an induction heating apparatus.
Figure 2:
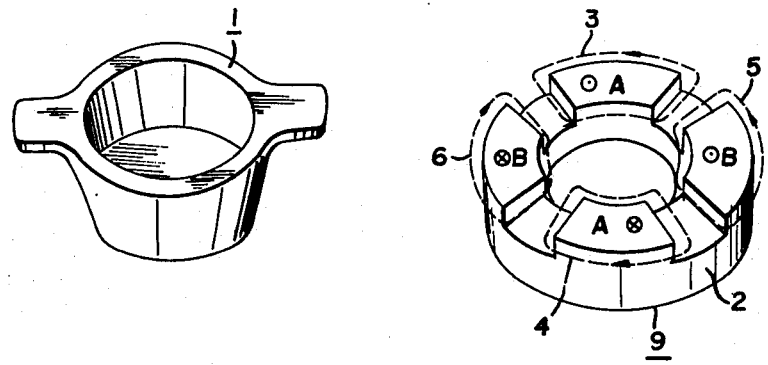
FIG. 2 is a schematic view of a heating element and an excitation core of the induction heating apparatus of FIG. 1.
Figure 3:
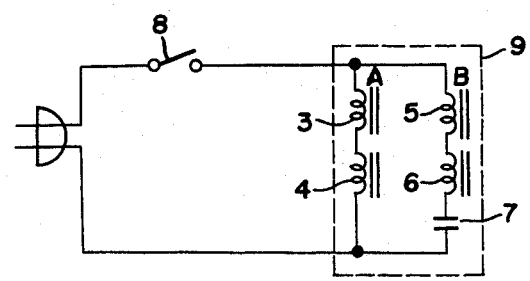
FIG. 3 is a diagram of a basic electrical circuit for the induction heating apparatus.

Referring now to the drawings, wherein like reference numerals designate identical or corresponding parts throughout the several views, and more particularly to FIGS. 1–3 thereof, the induction heating apparatus for heating with high efficiency without noise even though the exciting current is of low frequency such as commercial frequency comprises (1) an excitor 9 forming at least two groups of magnetic circuits A, B which include excitation cores 2 wound by excitation windings 3, 4, 5, 6 and a capacitor 7 having a specific value connected in series to at least one of the excitation windings so as to pass current having a 45° phase gain from the power voltage to the excitation windings 5, 6 and so as to pass current having a 45° phase delay from the power voltage to the excitation windings 3, 4 and (2) a heating element 1 such as a cooking apparatus e.g. a specific pot which has a bottom of plied plates (or alloy) made of non-magnetic metal 11 e.g. copper and ferromagnetic metal 10 e.g. iron, as shown in FIGS. 1, 2 and 3.

The alternating magnetic flux 15 passing through the excitation core 2 imparts an attractive force by one group of the magnetic flux and a repulsive force by the other group of the magnetic flux. The composed force becomes a constant attractive force for remarkably decreasing the vibration and the noise generated from the specific cooking pot 1 and for heating it with a large eddy current loss in the non-magnetic metal 11.

Figure 4:
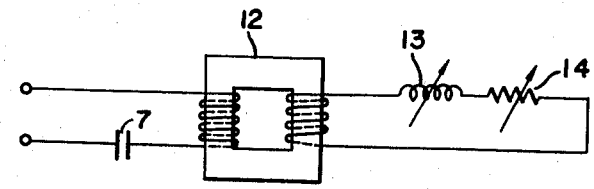
FIG. 4 is an electrical equivalent network for the circuit of FIG. 3.
Figure 5:
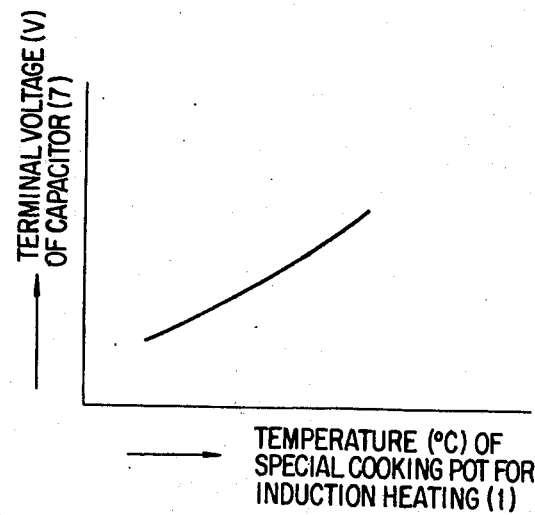
FIG. 5 is a graph showing the relation of the voltage applied to the capacitor and the temperature of the heating element.

In the induction heating apparatus having this structure, the operation at the abnormal state will now be explained. The magnet windings 5, 6, the capacitor 7 and the cooking apparatus 1 are shown by the electrical equivalent circuit of FIG. 4. That is, the excitation core 2 and the excitation windings 5, 6 are shown by transformer 12; and the specific cooking pot 1 is shown by variable reactor 13 with variable resistors 14 as the load in the secondary side. The capacitor 7 is directly connected to the transformer 12 at the primary side.

When the specific cooking pot 1 is heated while empty the temperature of the specific cooking pot increases because of the lack of a load in the cooking pot. This can be shown by the increase of an inductance of the variable reactor 13 and the resistance of the variable resistor 14.

The composite impedance Z in the primary side of the transformer 12 is given by the equation:

$$Z = R + j(\omega L - \frac{1}{\omega C}) \qquad (A)$$

wherein
R: a resistance of the variable resistor;
L: an inductance of the variable reactor 13;
C: a capacity of the capacitor 7
$2\omega L = 1/\omega C$.

Accordingly, during overheating, R is increased and $\omega L$ is also increased but lower than 2 times. The resistance component of the composite impedance is increased and the reactance component of the composite impedance is decreased. The increase of the resistance component is lower than the decrease of the reactance, and, accordingly, the composite impedance Z is decreased. That is, the current passing through the series circuit B of the excitation windings 5, 6 and the capacitor 7 (the primary side of the transformer) is increased depending upon the increase of the temperature of the specific cooking pot 1. Accordingly the terminal voltage of the capacitor 7 is increased depending upon the increase of the temperature of the specific cooking pot 1.

When a pot other than the required cooking pot is used, the above-mentioned phenomenon increases the current passing to the series circuit B of the excitation windings 5, 6 and the capacitor 7. When a current is passed to the excitor without a cooking pot, R is decreased to about 1/10 and $\omega L$ is increased but lower than 2 times and the composite impedance Z is decreased in a manner similar to the above-mentioned case. Accordingly, the current passing to the series circuit B of the excitation windings 5, 6 and the capacitor 7 is increased to 1.5 times and about a 40° phase gain is realized.

As is clear from the illustration, in the three abnormal states, an over current is passed. Accordingly, it is possible to control the current passed to the excitor by detecting the change of the current.

Figure 6:
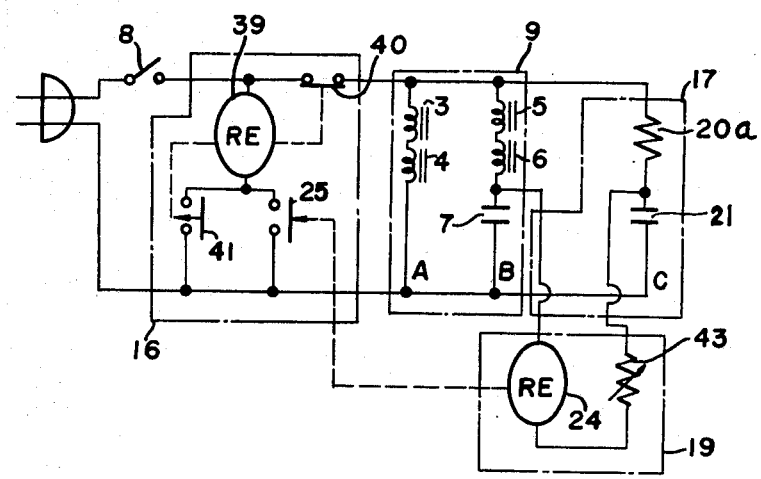
FIG. 6 is a diagram of an electrical circuit of the induction heating apparatus equipped with the protective device according to the invention.

One embodiment of the invention will now be explained. In FIG. 6, a series circuit 17 of the resistor 20a and the capacitor 21 is connected in parallel to the series circuit B of the excitation windings 5, 6 and the capacitor 7 of the excitor 9. The series circuit 17 is a detector for detecting the current and the deviation of the phase of the current passed to the series circuit B. In the series circuit 17, the resistance of the resistor 20a and the capacitance of the capacitor 21 are set so as to pass a current having substantially the same phase with that of the current passed to the series circuit B of the excitation windings 5, 6 and the capacitor 7 in the normal operation state. A relay 24 is connected to both of the series circuits B, C so as to apply a difference of the terminal voltages of the capacitors 7, 21 through the variable resistor 43. The relay 24 is actuated when the current and the phase of the current passed to the series circuit B are changed to a value higher than the predetermined range set by the variable resistor 43 to correspond to the normal state. The relay 24 is part of a driving device 19 for turning on the normally turned-off contact 25 in the abnormal operation state. Driving device 19 is also connected to the detector 17 of the series circuit C. A relay 39 is connected to the normally turned-off contact 25 of the relay 24 and is also connected to the excitor 9 in parallel to the power source so as to be actuated at the turn-on of the contact 25.

The relay 39 comprises a normally turned-on contact 40 connected so as to be able to break the current passed to the excitor and a normally turned-off contact 41 connected so as to be self-sustained by the turn-on of the contact 25 of the relay 24 by the driving device 19. The relay 39 operates as a breaker 16 in the abnormal operation state. In the circuit, even though a main switch 8 is turned on in the normal operation state, current having substantially the same phase is passed to the capacitors 7, 21 whereby a voltage required for actuation is not applied to the relay 24 which is actuated by the difference of the terminal voltages of the capacitors 7, 21. Accordingly, the induction heating apparatus continues the normal operation.

In the abnormal operation state, the current passed to the capacitor 7 is increased and the phase is deviated. However, the current passed to the capacitor 21 is not changed and the phase is not deviated. Accordingly, a difference of the terminal voltages of the capacitors 7, 21 is generated. When the difference of the terminal voltages exceeds a predetermined range set by the variable resistor 43, the relay 24 is actuated to turn-on the contact 25 whereby voltage is applied to the relay 39 as the breaker 16 so as to actuate the relay. The contact 40 is turned off to break the current passed to the excitor 9 and simultaneously the contact 41 is turned on. Accordingly, the voltage is not applied to the relay 24 of the driving device 19 whereby the self-sustaining circuit is formed and the break state is maintained even though the contact 25 is in its turned off-state. When normal operation returns, the main switch 8 is turned off and the relay 39 is reset and then the main switch 8 is turned on again. In order to signal the abnormal state, an alarm lamp or an alarm buzzer is connected in a circuit of the relay 39.

Thus, for the operational state of the circuit, it is provided that the maximum limit for maintaining inactivation of the 16 is a temperature of 300°C of the specific cooking pot. The breaker 16 is actuated when the temperature of the specific cooking pot is above 300°C or a different pot is used, or no pot is put on the apparatus. As is clear from the relationship between the change of the power voltage and the voltage applied by the detector 17 of FIG. 6 for the applications shown in FIG. 7, a difference $T_1$ between the voltage for keeping the inactivation of the breaker 16 by the drive device 19 and the voltage for activating the breaker is only about 6 volts which is less than about 20 volts of the deviation for the fluctuation of ± 10% to 100 volts of the power voltage. Accordingly, there is the disadvantage of an over protective state and an erronous protection state caused by the fluctuation of the power voltage by applying a constant predetermined voltage.

Figure 8:
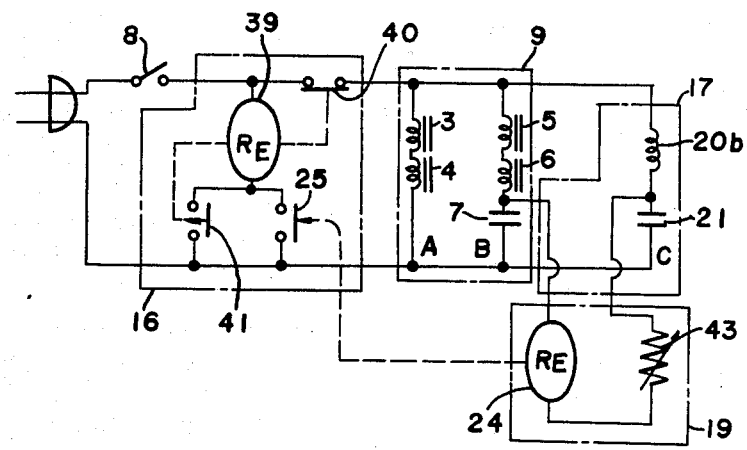
FIG. 8 is a diagram of an electrical circuit for a modified embodiment of the invention.
Figure 9:
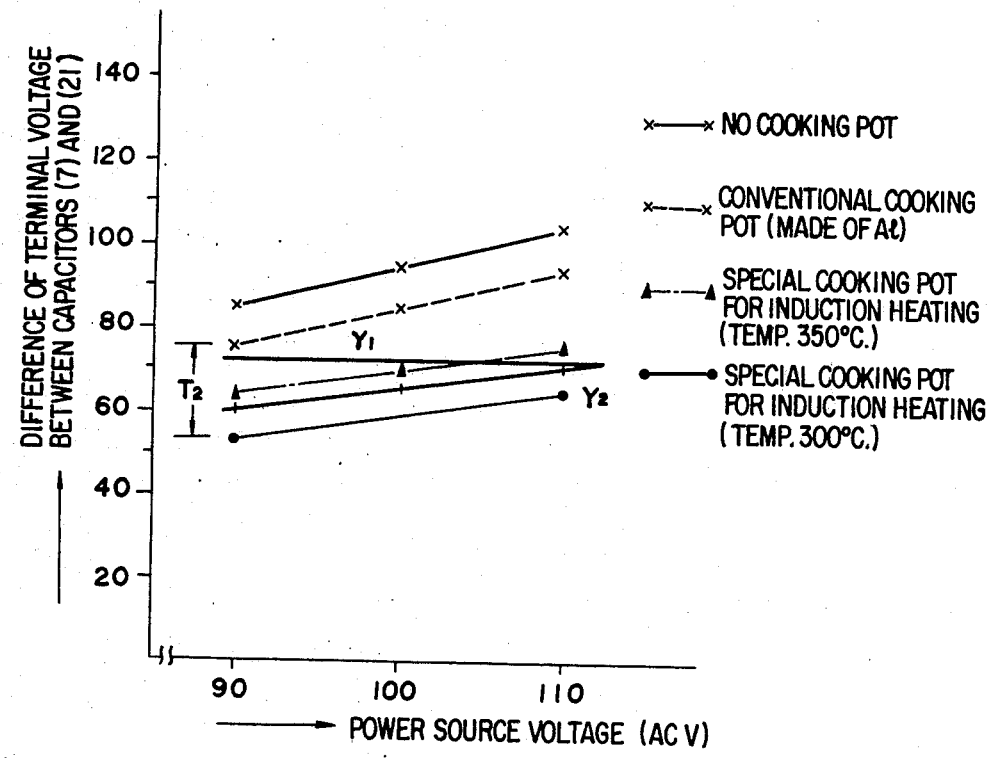
FIG. 9 is a graph showing the relationship between the power voltage and voltages applied by the detector of FIG. 8 in the normal operation state and in the abnormal operation state.

FIG. 8 is another embodiment of the circuit of the invention for overcoming the above noted disadvantages and replaces the resistor 20a by the reactor 20b in the detector 17 of the series circuit C which is connected in parallel to the series circuit B of the excitor 9. When the resistor 20a is replaced by the reactor 20b and the power factor of the reactor 20b is substantially equal to the power factor of the excitation windings 5, 6 and when the phase of the capacity of the capacitor 21 is set to give substantially the same phase as that of the current passing to series circuit B of excitor 9 during normal operation of the current passing to series circuit C, the difference as shown in FIG. 9 of the terminal voltages of the capacitors 7 and 21 result from the change of the current of the series circuit B and the phase change in the normal operation state and in the abnormal operation state. As a result, the difference $T_2$ between the voltage for maintaining inactuation of the breaker 16 and the voltage for actuating the breaker is about 21 volts which is higher than 20 volts of the deviation of ± 10% of the power voltage.

Figure 7:
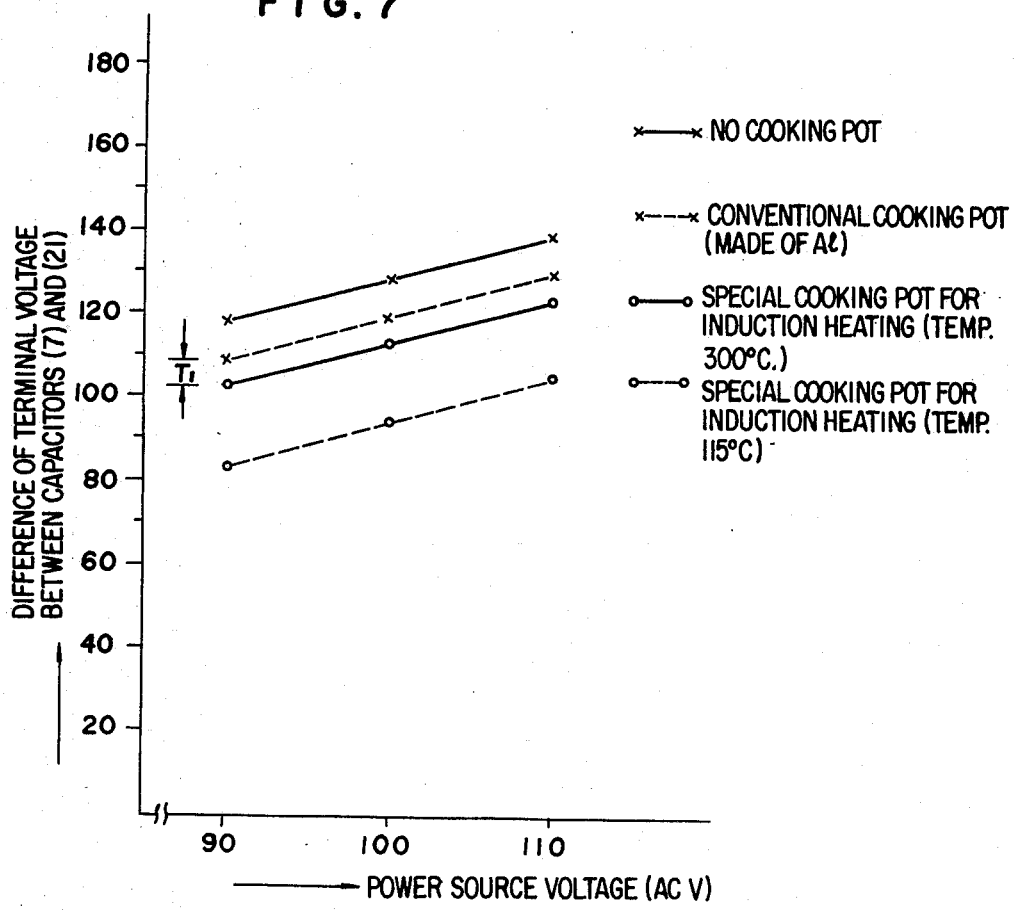
FIG. 7 is a graph showing the relationship between the power voltage and the voltages applied by the detector of FIG. 6 in the normal operation state and in the abnormal operation state.

Accordingly, the problems shown in FIG. 7 are overcome by setting the turn-point of the breaker 16 to a constant predetermined voltage such as the $Y_1$ line of FIG. 9. However, the embodiment of FIG. 8 has the following disadvantage so that an improvement is required. As is clear from FIG. 9, the first problem is to actuate the breaker 16 by the power voltage when the temperature of the specific cooking pot 1 is abnormally raised in the abnormal operation of heating an empty pot. The second problem is to cause the raising of the temperature of the cooking pot to 350°C since actuating the breaker at 300°C of the temperature of the cooking pot 1 is not suitable (for example, the temperature of the oil in the fry is about 180°C and the temperature of the cooking pot is above 300°C in the normal operation state.) The third problem is caused by applying the voltage difference between the capacitors 7 and 21 to the relay 234 by dividing the ratio of the resistance to the impedance of the excitation winding of the relay 24. That is, the voltage applied to the relay 24 is gradually increased depending upon the increase of the voltage difference between the capacitors 7 and 21 by use in the abnormal operation state. The relay 24 causes chattering when the voltage applied to the relay approaches the operational voltage. In general, the fluctuation of the operational voltage of the relay 24 is found. It is necessary to adjust the value of the resistor 43 for each relay during mass production.

Figure 10:
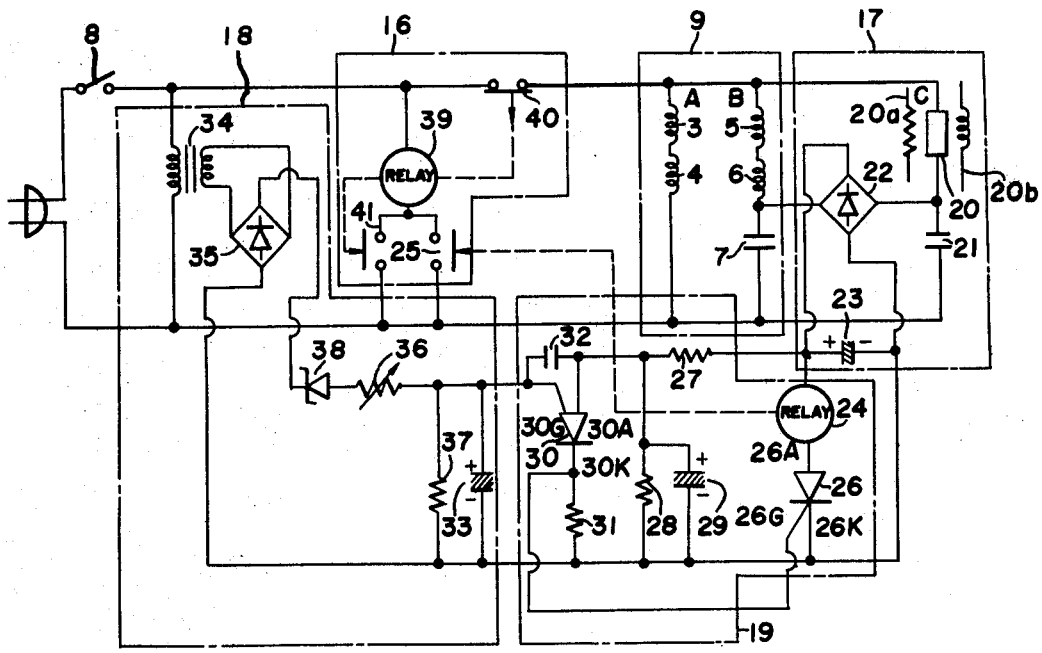
FIG. 10 is a diagram of an electrical circuit for another embodiment of the invention.

In order to overcome the above-mentioned disadvantages, the embodiment of the invention shown in FIG. 10 is proposed. In FIG. 10, the reference numeral 20 designates an impedance element having a power factor which is substantially equal to the power factor of the excitation windings 5 and 6 in the normal operation state and may be a reactor or a resistor; 21 designates a capacitor connected in series to the impedance element 20, the capacity of the capacitor being set so as to make the phase of the current passing to the series circuit C substantially the same as the phase of the current passing to the series circuit B of the excitation windings 5, 6 and the capacitor 7; 22 designates a diode bridge connecting one input terminal to the contact of the excitation windings 5, 6 and the capacitor 7, connecting the other input terminal to the contact of the impedance element 20 and the capacitor 21 and connecting the output terminals to both of the terminals of the capacitor 23.

The detector 17 for detecting the change of the current passing to the series circuit B of the excitor 9 and converting it to the change of DC voltage is composed of the impedance element 20, the capacitor 21, the diode bridge 22 and the capacitor 23. The reference numeral 30 designates a programable uni-junction transistor (hereinafter referred to as PUT). The output voltage of the detector 17 is applied to the anode 30A of PUT after division by the resistors 27, 28. 29 designates a capacitor connected in parallel to the resistor 28. The function of capacitor 29 is to smooth further the voltage applied to the anode 30A and the cathode 30K of PUT 30. 32 designates a capacitor connected to the gate 30G and the anode 30A of PUT 30 and is to prevent an erroneous operation of PUT 30 caused by outer noise. 24 designates a relay connected through a semiconductor switching element such as a thyristor 26 to the output terminal of the detector 17 and is actuated by applying the output voltage of the detector 17 at the turn-on state of the thyristor 26 by passing the current to the gate 26G of the thyristor 26 when the PUT 30 is turned on.

The reference numeral 31 designates a short-circuit resistance between the gate 26G and the cathode of the thyristor 26. The driving device 19 is composed of the PUT 30, the resistors 27, 28, 31, the capacitors 29, 32, the relay 24, and the thyristor 26.

The reference numeral 35 designates a diode bridge for converting the AC voltage dropped by the transformer from the power voltage to the DC voltage. 36 and 37 designate resistors for applying the DC voltage through the zener diode 38 to the gate 30G of the PUT 30 in divided state. Resistor 37 is connected in parallel with capacitor 33 for smoothing the DC voltage applied between the gate 30G and the cathode 30K of the PUT 30.

Accordingly, the DC current changes depending upon the fluctuation of the power voltage and is applied to the gate 30G of the PUT 30 and the compensating coefficient thereof is decided by the zener diode 38. The power voltage compensating device 18 is comprised of the transformer 34, the diode bridge 35, the zener diode 38, the resistors 36, 37 and the capacitor 33. The reference numeral 39 designates a relay connected to a normally turned-off contact 25 of the relay 24 and is also connected in parallel to the excitor 9 and to the power source so as to be actuated at the turn-on of the contact 25. The relay comprises a normally turned-on contact 40 connected so as to break the current to the excitor 9 and a normally turned-off contact 41 connected so as to form a short circuit between the contact 25 and the relay 24 to yield self-sustaining operation and functions as a part of breaker 16 during abnormal states. The relation of the power voltage and the output voltage of the detector in the normal state and in the abnormal state is different whether the impedance element 20 is the resistor 20a or the reactor 20b as shown in FIG. 7 and FIG. 9.

The operation will now be explained with reference to FIG. 9. The output voltage of the detector at the time the breaker 16 is actuated is given as the break voltage $Y_2$. The resistor 36 is set so as to give a break voltage of 65 volts and 60 volts; 90 volts and 70 volts: 110 volts. [4 – 5 volts lower than that of heating with an empty pot (350°C of the temperature of the pot)]. The regulation of the break voltage is set by the zener diode so as to change depending upon the fluctuation of the power voltage.

In normal state operation, a voltage proportional to the power voltage is applied to the gate 30G of the PUT 30. The output voltage of the detector 17 is applied to the anode 30A after division. However, current having substantially the same phase is applied to the capacitors 7 and 21 whereby the output voltage of the detector 17 is small. Accordingly, the voltage applied to the anode 30A of the PUT 30 is lower than the voltage applied to the gate 30G whereby the PUT 30 keeps it in its turned off state and the thyristor 26 maintains the turned off state so that the voltage required for the actuation of the relay 24 is not applied and the induction heating apparatus continues normal operation.

In the abnormal operation, the current passing to capacitor 7 is increased and the phase is changed. However, the current and the phase of the current passing to the capacitor 21 are not changed whereby the output voltage of the detector 17 is increased. Accordingly, the voltage applied to the anode 30A of the PUT 30 is increased. When the voltage is increased over the voltage applied to the gate 30G, the PUT 30 is turned on to pass the current to the gate 26G of the thyristor 26 so as to turn-on the thyristor 26 whereby the relay is actuated by applying the voltage to turn-on the contact 25. The relay 39 controlling the breaker 16 is actuated by applying the voltage. Accordingly the contact 40 is turned off to break the current passed to the excitor 9. Simultaneously the contact 41 is turned on whereby the output of the detector 17 is cut off, the voltage is not applied to the relay 24 and the breaking state is maintained even though the contact 25 is turned off because of the self-sustaining circuit. In order to signal the formation of the abnormal state, an alarm lamp or buzzer is connected in the circuit of the relay 39.

When the normal operation is resumed, the main switch 8 is turned off, the relay 39 is reset and then the main switch 8 is turned on. As stated above, in accordance with this embodiment, even though the power voltage fluctuates, the voltage change depending upon the power voltage is applied to the gate 30G of the PUT 30. The output voltage of the detector 17 at the time the PUT 30 is turned on, that is the break voltage $Y_2$, is changed whereby the prevention of the normal heating caused by over protection by the fluctuation of the power voltage can be overcome and the lack of the protection from heating an empty pot can be overcome. The protecting device is actuated at a substantially constant temperature of the pot at the time an empty pot is heated regardless of the fluctuation of the power voltage. When the relay 24 is used as the element for controlling the breaker, the semiconductor switching element 26 is connected in series to the relay 24. Accordingly, the relay 24 does not cause chattering and the complicated operation during mass production for adjusting the resistance depending upon the deviation of the operating voltage for each relay 24 is eliminated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective device for an induction heating apparatus comprising:
    an excitor circuit connected to a power voltage source for induction heating a heating element by generating an alternating magnetic field,
    a detector circuit connected to the excitor circuit for detecting a change in voltage in the excitor circuit indicating an over current therein and for generating a first signal representative thereof,
    a breaker circuit connected to the excitor circuit for interrupting, when activated, voltage from the power voltage source to the excitor circuit,
    a driver circuit connected to the breaker circuit and to the detector circuit comprising a control element for activating the breaker circuit and a switch connected thereto for activating the control element,
    a power voltage compensating circuit connected to the driver circuit for compensating for power voltage fluctuations and for generating a second signal representative of the compensated power voltage,
    the switch having first and second inputs to receive the first and second signals respectively and activating the control element to activate the breaker circuit to interrupt the voltage from the power voltage source to the excitor circuit when the first and the second signals are of a predetermined relationship indicating an over current in the excitor circuit.

2. A protective device for an induction heating apparatus in accordance with claim 1 wherein the switch comprises a programmable uni-junction transistor, the control element comprises a relay and further comprising a thyristor with its anode, cathode and gate connected between the cathode of the programmable uni-junction transistor and the relay.

* * * * *